(12) United States Patent
Shumaker et al.

(10) Patent No.: US 12,483,277 B2
(45) Date of Patent: Nov. 25, 2025

(54) QUADRATURE CHIRP GENERATION (71) Applicant: Intel Corporation, Santa Clara, CA (US)

(72) Inventors: Evgeny Shumaker, Nesher (IL); Run Levinger, Portland, OR (US); Ofir Degani, Haifa (IL)

(73) Assignee: Intel Corporation, Santa Clara, CA (US)

( * ) Notice: Subject to any disclaimer, the term of this patent is extended or adjusted under 35 U.S.C. 154(b) by 740 days.

(21) Appl. No.: 17/695,868

(22) Filed: Mar. 16, 2022

(65) Prior Publication Data
US 2023/0299796 A1   Sep. 21, 2023

(51) Int. Cl.
*H04B 1/38* (2015.01)
*H04B 1/00* (2006.01)
*H04B 1/04* (2006.01)

(52) U.S. Cl.
CPC ......... *H04B 1/0014* (2013.01); *H04B 1/0078* (2013.01); *H04B 1/0082* (2013.01); *H04B 1/0483* (2013.01)

(58) Field of Classification Search
CPC .. H04B 1/0014; H04B 1/0078; H04B 1/0082; H04B 1/0483; H04B 1/0039; H04B 1/04; H04B 2001/0408
See application file for complete search history.

(56) References Cited

U.S. PATENT DOCUMENTS

| | | | |
|---|---|---|---|
| 9,270,301 B2 * | 2/2016 | Väisänen | H04B 1/406 |
| 10,003,310 B1 * | 6/2018 | Masood | H03F 3/245 |
| 11,927,665 B2 * | 3/2024 | Leabman | G01S 13/88 |
| 2016/0127164 A1 * | 5/2016 | Muhammad | H03F 3/24 |
| | | | 375/297 |
| 2022/0158732 A1 * | 5/2022 | Wang | H03M 3/452 |

* cited by examiner

*Primary Examiner* — Tuan Pham
(74) *Attorney, Agent, or Firm* — Viering, Jentschura & Partner mbB (57) ABSTRACT

A system may include a digital front end (DFE). The DFE may be configured to generate a command signal. The system may also include a sweeper. The sweeper may be configured to generate an intermediate in-phase signal, an intermediate quadrature signal, and a LO signal based on the command signal. In addition, the system may include a mixer. The mixer may be configured to generate a mixed in-phase signal based on the intermediate in-phase signal and the LO signal. The mixer may also be configured to generate a mixed quadrature signal based on the intermediate quadrature signal and the LO signal. Further, the system may include an amplifier. The amplifier may be configured to generate an in-phase signal based on the mixed in-phase signal and an amplification setting. The amplifier may also be configured to generate a quadrature signal based on the mixed quadrature signal and the amplification setting.

19 Claims, 7 Drawing Sheets

QUADRATURE CHIRP GENERATION

FIELD

The aspects discussed in the present disclosure are related to quadrature chirp generation.

BACKGROUND

Unless otherwise indicated in the present disclosure, the materials described in the present disclosure are not prior art to the claims in the present application and are not admitted to be prior art by inclusion in this section.

A ranging device may perceive an environment proximate the ranging device using transmit signals (e.g., radio signals, light signals, or some combination thereof) and echo signals. The ranging device may include light-based sensors (e.g., light detection and ranging (LIDAR) sensors), radio-based sensors (e.g., radio detection and ranging (RADAR) sensors), or some combination thereof to generate the transmit signals and receive the echo signals. The RADAR sensors, the LIDAR sensors, or some combination thereof may include a frontend (e.g., a RADAR frontend, a LIDAR frontend, or some combination thereof), an antenna array, a processor (e.g., a RADAR processor, a LIDAR processor, or some combination thereof), or any other appropriate component for range detection.

The frontend may generate an in-phase signal and a quadrature signal (e.g., chirp signals in which a frequency of the signals changes over time). The antenna array may be electrically coupled to the frontend and may transmit the transmit signals into the environment based on the in-phase signal and the quadrature signal. The transmit signals may be reflected by objects within the environment and received by the antenna array as the echo signals. The processor may calculate information including position, speed, direction, or any other appropriate data point of the objects within the environment with respect to the ranging device based on the echo signals.

The subject matter claimed in the present disclosure is not limited to aspects that solve any disadvantages or that operate only in environments such as those described above. Rather, this background is only provided to illustrate one example technology area where some aspects described in the present disclosure may be practiced.

BRIEF DESCRIPTION OF THE DRAWINGS

Example aspects will be described and explained with additional specificity and detail through the use of the accompanying drawings in which.

DETAILED DESCRIPTION

A ranging device may perceive an environment proximate the ranging device using transmit signals (e.g., radio signals, light signals, or some combination thereof) and echo signals. The ranging device may include a light-based sensor (e.g., a LIDAR sensor), a radio-based sensor (e.g., a RADAR sensor), or some combination thereof to generate the transmit signals and receive the echo signals. The ranging device may include a frequency-modulated continuous-wave (FMCW) radar device. In addition, the ranging device may include a millimeter-wave ranging device.

The RADAR sensor, the LIDAR sensor, or some combination thereof may include a frontend (e.g., a RADAR frontend, a LIDAR frontend, or some combination thereof), an antenna array, a processor (e.g., a RADAR processor, a LIDAR processor, or some combination thereof), or any other appropriate component for range detection. The frontend may generate an in-phase signal and a quadrature signal (e.g., chirp signals in which a frequency changes over time). The antenna array may be electrically coupled to the frontend and may transmit the transmit signals into the environment based on the in-phase signal and the quadrature signal. The transmit signals may be reflected by objects within the environment and received by the antenna array as the echo signals. The processor may calculate information including position, speed, direction, or any other appropriate data point of the objects within the environment with respect to the ranging device based on the echo signals.

Some frontend devices may generate excess power that is to be dissipated to achieve coherency (e.g., low phase noise), frequency agility (e.g., signal bandwidth), linearity of the chirp signals (e.g., linearity of the in-phase signal and the quadrature signal), or some combination thereof. Some frontend devices may include a direct digital synthesis (DDS) device. The DDS device may generate arbitrary waveforms based on a single fixed-frequency clock signal. However, the DDS device may include a digital to analog converter (DAC) that controls a conversion rate and a digital resolution of the DDS device. To increase the digital resolution of the DAC (e.g., the DDS device), both a footprint of the DAC and an amount of power to be dissipated may increase.

Some frontend devices may include a fractional-N digital phase lock loop (DPLL) device. The fractional-N DPLL may sweep a frequency control word in time to force an oscillator within the fractional-N DPLL to change a frequency of an output signal. The fractional-N DPLL may include a single injection point, which may limit an agility of frequency tuning of the output signal based on a loop bandwidth. Increasing the loop bandwidth of the fractional-N DPLL may increase an in-band phase noise of the output signal.

Some frontend device may include an opto-electronic generator that includes narrow-linewidth lasers. An output (e.g., optical signals) of the narrow-linewidth lasers may be wavelength swept by means of current or temperature dependence. The output of the narrow-linewidth lasers may be coupled to a single photodiode. An output signal of the single photodiode may include a difference between a frequency of the output of the narrow-linewidth lasers. The opto-electronic generator may include a limited tuning range due to temperature varying delays. In addition, the opto-electronic generator may generate a non-linear output due to frequency changes only being approximately linear. Further, the opto-electronic generator may generate a large amount of power that is to be dissipated.

Some aspects described in the present disclosure may generate the in-phase signal and the quadrature signal as synchronized signals. In addition, the in-phase signal and the quadrature signal may be generated by mixing outputs of a sweeper (e.g., counter swept frequency modulators). The sweeper may include an all-digital phase lock loop (PLL) architecture that includes either two-point injected modulation (e.g., direct) or digital to time converter (DTC) modulation (e.g., posterior). Any amplitude imbalance correction or pre-emphasis may follow the mixing and filtering.

A system may include a digital front-end (DFE), a sweeper, a mixer, and an amplifier. The DFE may generate a command signal. The sweeper may generate an intermediate in-phase signal, an intermediate quadrature signal, and a local oscillator (LO) signal based on the command signal. The mixer may generate a mixed in-phase signal based on the intermediate in-phase signal and the LO signal. The mixer may also generate a mixed quadrature signal based on the intermediate quadrature signal and the LO signal. The amplifier may generate the in-phase signal based on the mixed in-phase signal and an amplification setting. The amplifier may also generate the quadrature signal based on the mixed quadrature signal and the amplification setting.

Alternatively, the sweeper may generate a first LO signal and a second LO signal based on the command signal. The mixer may generate the mixed signal based on the first LO signal and the second LO signal. The system may include a divide-by-two frequency divider (DIV2). The DIV2 may generate the intermediate in-phase signal and the intermediate quadrature signal based on the mixed signal. The amplifier may generate the in-phase signal based on the intermediate in-phase signal and the amplification setting. The amplifier may also generate the quadrature signal based on the intermediate quadrature signal and the amplification setting.

One or more aspects described in the present disclosure may generate the in-phase signal and the quadrature signal with a low amount of excess power to be dissipated. The PLL may generate the in-phase signal and the quadrature signal with low noise and a distortion single tone signal. In addition, one or more aspects described in the present disclosure may provide a large tuning range for the in-phase signal and the quadrature signal. The tuning range may be based on a summation of the frequencies of the intermediate in-phase signal and the intermediate quadrature signal. Further, two-point (2P) modulation, DTC modulation, or some combination thereof may generate a signal whose rate of change is not limited by the loop bandwidth of the PLL.

These and other aspects of the present disclosure will be explained with reference to the accompanying figures. It is to be understood that the figures are diagrammatic and schematic representations of such example aspects, and are not limiting, nor are they necessarily drawn to scale. In the figures, features with like numbers indicate like structure and function unless described otherwise.

Figure 1:
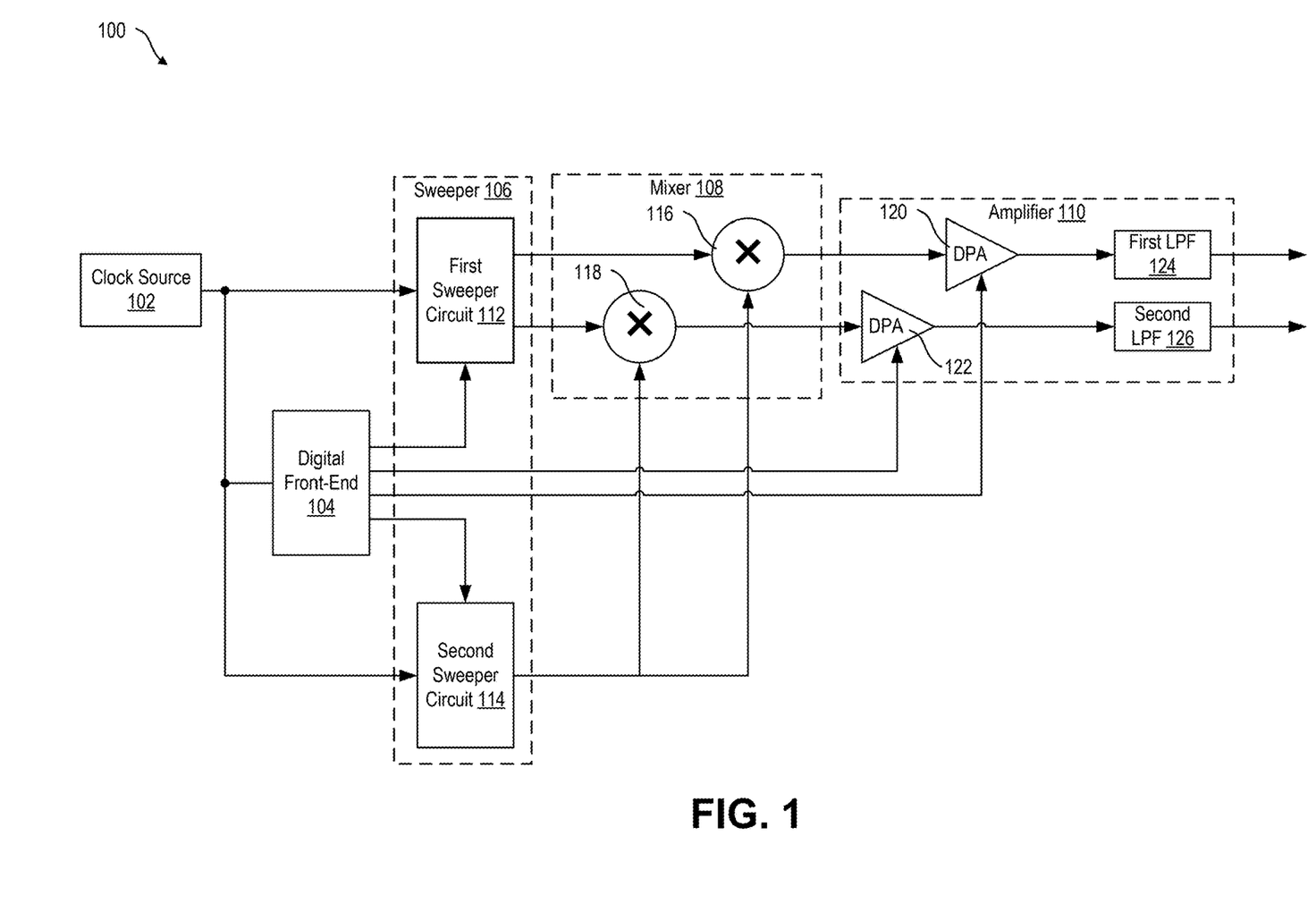
FIG. 1 illustrates a block diagram of an exemplary chirp generator system.

FIG. 1 illustrates a block diagram of an exemplary chirp generator system 100 (generally referred to in the present disclosure as "system 100"), in accordance with at least one aspect described in the present disclosure. The system 100 may be implemented as part of the frontend.

The system 100 may include a clock source 102, a DFE 104, a sweeper 106, a mixer 108, and an amplifier 110. The sweeper 106 may include a first sweeper circuit 112 and a second sweeper circuit 114. The mixer may include a first mixer circuit 116 and a second mixer circuit 118. The amplifier 110 may include a first digital power amplifier (DPA) circuit 120, a second DPA circuit 122, a first low pass filter (LPF) 124, and a second LPF 126.

The first sweeper circuit 112 may be electrically coupled to an output of the DFE 104, an output of the clock source 102, an input of the first mixer circuit 116, and an input of the second mixer circuit 118. The second sweeper circuit 114 may be electrically coupled to an output of the DFE 104, an output of the clock source 102, an input of the first mixer circuit 116, and an input of the second mixer circuit 118. The DFE 104 may be further electrically coupled to an output of the clock source 102, an input of the first DPA circuit 120, and an input of the second DPA circuit 122.

The first mixer circuit 116 may be further electrically coupled to an input of the first DPA circuit 120. The second mixer circuit 118 may be further electrically coupled to an input of the second DPA circuit 122. The first DPA circuit 120 may be further electrically coupled to an input of the first LPF 124. The second DPA circuit 122 may be further electrically coupled to an input of the second LPF 126.

The clock source 102 may generate a clock signal. The first sweeper circuit 112, the second sweeper circuit 114, and the DFE 104 may synchronously receive the clock signal. The first sweeper circuit 112 may generate an intermediate in-phase signal and an intermediate quadrature signal based at least in part on the clock signal. The second sweeper circuit 114 may generate a LO signal based at least in part on the clock signal. In addition, the DFE 104 may generate a command signal based at least in part on the clock signal. The intermediate in-phase signal, the intermediate quadrature signal, the LO signal, and the command signal may be generated so as to be aligned to the clock signal to sync these signals to a common time reference.

The DFE 104 may generate a first command signal based on the clock signal. The DFE 104 may also generate a second command signal based on the clock signal. The first command signal and the second command signal may form the command signal. In addition, the DFE 104 may generate a first amplification signal and a second amplification signal based on the clock signal. The DFE 104 may synchronously provide the first command signal and the second command signal to the sweeper 106 based on the clock signal. In addition, the DFE 104 may synchronously provide the first amplification signal and the second amplification signal to the amplifier 110 based on the clock signal.

The first sweeper circuit 112 may generate the intermediate in-phase signal and the intermediate quadrature signal. The first sweeper circuit 112 may generate the intermediate in-phase signal and the intermediate quadrature signal based on the first command signal and the clock signal. The second sweeper circuit 114 may generate the LO signal based on the second command signal and the clock signal.

The first sweeper circuit 112 may modulate a phase of the intermediate in-phase signal and a phase of the intermediate quadrature signal. The second sweeper circuit 114 may modulate a phase of the LO signal. The second sweeper circuit 114 may modulate the phase of the LO signal to cause the frequency of the LO signal to sweep in a direction opposite the frequency of the intermediate in-phase signal and the frequency of the intermediate quadrature signal.

The mixer 108 may generate a mixed in-phase signal based on the intermediate in-phase signal and the LO signal. The mixer 108 may also generate a mixed quadrature signal based on the intermediate quadrature signal and the LO signal. The first mixer circuit 116 may mix the intermediate in-phase signal and the LO signal. The second mixer circuit 118 may mix the intermediate quadrature signal and the LO signal.

The amplifier 110 may generate the in-phase signal based on the mixed in-phase signal and an amplification setting. The amplifier 110 may also generate the quadrature signal based on the mixed quadrature signal and the amplification setting. The first DPA circuit 120 may amplify an amplitude of the mixed in-phase signal based on the amplification setting and the first amplification signal. The second DPA circuit 122 may amplify an amplitude of the mixed quadrature signal based on the amplification setting and the second amplification setting.

The first LPF 124 may filter out a high pass portion of the mixed in-phase signal to generate the in-phase signal including the amplified amplitude. The second LPF 126 may filter out a high pass portion of the mixed quadrature signal to generate the quadrature signal including the amplified amplitude.

The system 100 may be configured as a frequency ramp generator and the in-phase signal and the quadrature signal may be generated as frequency ramp signals for range detection of an object within an environment. For example, the in-phase signal and the quadrature signal may be provided to additional components and subsequently an antenna array. The additional components may modulate an optical signal in a LIDAR system based on the in-phase signal and the quadrature signal. Alternatively, the additional components may modulate a very high frequency carrier (e.g., a millimeter (mm) or sub-mm wavelength) based on the in-phase signal and the quadrature signal. The antenna array may transmit transmit signals representative of the modulated optical signal or the modulated high frequency carrier into the environment to detect the object within the environment.

Figure 2:
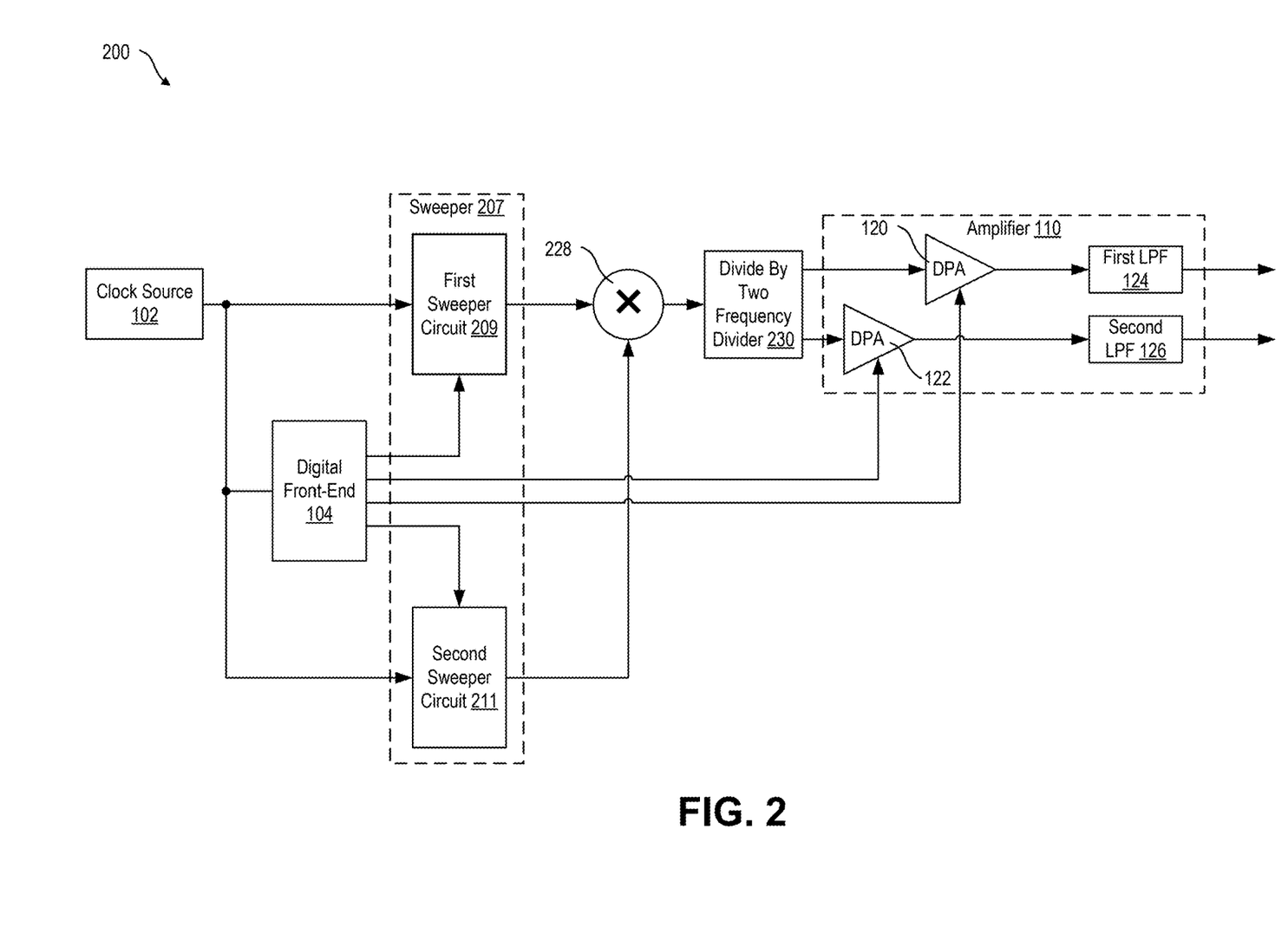
FIG. 2 illustrates a block diagram of another exemplary chirp generator system.

FIG. 2 illustrates a block diagram of another exemplary chirp generator system 200 (generally referred to in the present disclosure as "system 200"), in accordance with at least one aspect described in the present disclosure. The system 200 may be implemented as part of the frontend.

The system 200 may include the clock source 102, the DFE 104, a sweeper 207, a mixer circuit 228, a DIV2 230, and the amplifier 110. The sweeper 207 may include a first sweeper circuit 209 and a second sweeper circuit 211. The first sweeper circuit 209 may be electrically coupled to the output of the DFE 104, the output of the clock source 102, and an input of the mixer circuit 228. The second sweeper circuit 211 may be electrically coupled to the output of the DFE 104, the output of the clock source 102, and an input of the mixer circuit 228. The mixer circuit 228 may be further electrically coupled to an input of the DIV2 230. The DIV2 230 may be further electrically coupled to the input of the first DPA circuit 120 and the input of the second DPA circuit 122.

The first sweeper circuit 209, the second sweeper circuit 211, and the DFE 104 may synchronously receive the clock signal. The first sweeper circuit 209 may generate a first LO signal based at least in part on the clock signal. The second sweeper circuit 211 may generate a second LO signal based at least in part on the clock signal. The first LO signal, the second LO signal, and the command signal may be generated so as to be aligned to the clock signal to sync these signals to a common time reference.

The first sweeper circuit 209 may generate the first LO signal based on the clock signal and the command signal. The second sweeper circuit 211 may generate the second LO signal based on the clock signal and the command signal. The first sweeper circuit 209 may modulate a phase of the first LO signal. The second sweeper circuit 211 may modulate a phase of the second LO signal. The second sweeper circuit 211 may modulate the phase of the second LO signal to cause the frequency of the second LO signal to sweep in a direction opposite the frequency of the first LO signal.

The mixer circuit 228 may generate a mixed signal based on the first LO signal and the second LO signal. The mixer circuit 228 may mix the first LO signal and the second LO signal to generate the mixed signal. The DIV2 230 may generate an intermediate in-phase signal and an intermediate quadrature signal based on the mixed signal.

The amplifier 110 may generate the in-phase signal based on the intermediate in-phase signal and the amplification setting. The amplifier 110 may also generate the quadrature signal based on the intermediate quadrature signal and the amplification setting. The first DPA circuit 120 may amplify the amplitude of the intermediate in-phase signal based on the amplification setting and the first amplification signal. The second DPA circuit 122 may amplify the amplitude of the intermediate quadrature signal based on the amplification setting and the second amplification setting.

The first LPF 124 may filter out a high pass portion of the intermediate in-phase signal to generate the in-phase signal including the amplified amplitude. The second LPF 126 may filter out a high pass portion of the intermediate quadrature signal to generate the quadrature signal including the amplified amplitude.

The system 200 may be configured as a frequency ramp generator and the in-phase signal and the quadrature signal may be generated as frequency ramp signals for range detection of an object within an environment. For example, the in-phase signal and the quadrature signal may be provided to additional components and subsequently an antenna array. The additional components may modulate signals based on the in-phase signal and the quadrature signal. The antenna array may transmit transmit signals representative of the modulated signal into the environment to detect the object within the environment.

Figure 3A:
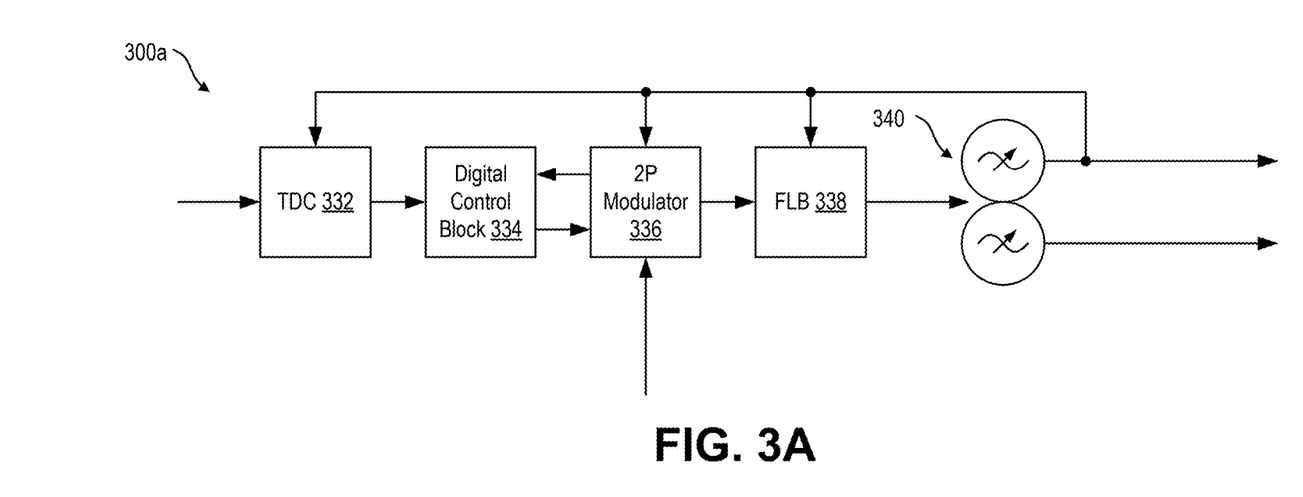
FIGS. 3A and 3B illustrate block diagrams of exemplary sweeper circuits that may be implemented in the system of FIG. 1.

FIG. 3A illustrates a block diagram of an exemplary sweeper circuit 300a that may be implemented in the system 100 of FIG. 1, in accordance with at least one aspect described in the present disclosure. The sweeper circuit 300a may correspond to the first sweeper circuit 112 of FIG. 1.

The sweeper circuit 300a may include a time to digital converter (TDC) 332, a digital control block 334, a two-point (2P) modulator 336, a fast logic block (FLB) 338, and an in-phase quadrature (IQ) digitally controlled oscillator (DCO) 340. The TDC 332 may be electrically coupled to the output of the clock source 102 (not illustrated in FIG. 3A), an in-phase output of the IQ DCO 340, and an input of the digital control block 334. The digital control block 334 may be further electrically coupled to an output of the 2P modulator 336 and an input of the 2P modulator 336. The 2P modulator 336 may be further electrically coupled to an input of the FLB 338, the in-phase output of the IQ DCO 340, and the output of the DFE 104 (not illustrated in FIG. 3A). The FLB 338 may be further electrically coupled to an input of the IQ DCO 340. Alternatively, the FLB 338, the 2P modulator 336, and the TDC 332 may be electrically coupled to a quadrature output of the IQ DCO 340 instead of the in-phase output.

The 2P modulator 336 may generate a low-pass command signal and a high pass command signal based on the command signal, a correction signal, the intermediate in-phase signal, the intermediate quadrature signal, or some combination thereof. The 2P modulator 336 may generate the low-pass command signal and the high pass command signal based on the first command signal, the correction signal, the intermediate in-phase signal, the intermediate quadrature signal, or some combination thereof. The low-pass command signal may indicate an intended phase of the intermediate in-phase signal or the intermediate quadrature signal. In addition, the 2P modulator 336 may provide the low-pass command signal to the digital control block 334. Further, the 2P modulator 338 may provide the high-pass command signal to the FLB The FLB 338 may generate a driver signal based on the high pass command signal, the intermediate in-phase signal, the intermediate quadrature signal, or some combination thereof. The FLB 338 may provide the driver signal to the IQ DCO 340. The IQ DCO 340 may generate the intermediate in-phase signal and the intermediate quadrature signal based on the driver signal. The IQ DCO 340 may provide the in-phase signal to the TDC 332, the 2P modulator 336, and the FLB 338. Alternatively, the IQ DCO 340 may provide quadrature signal to the TDC 332, the 2P modulator 336, and the FLB 338. The TDC 332 may generate a quantized signal based on the intermediate in-phase signal, the clock signal, the intermediate quadrature signal, or some combination thereof. The quantized signal may represent a difference between a current phase of the intermediate in-phase signal and a phase of the clock signal. Alternatively, the quantized signal may represent a difference between a current phase on the intermediate quadrature signal and the phase of the clock signal. The TDC 332 may provide the quantized signal to the digital control block 334.

The digital control block 334 may generate the correction signal based on the quantized signal and the low-pass command signal. The correction signal may indicate a difference between the current phase of the intermediate in-phase signal and the intended phase of the intermediate in-phase signal. Alternatively, the correction signal may indicate a difference between the current phase of the intermediate quadrature signal and an intended phase of the intermediate quadrature signal.

Figure 3B:
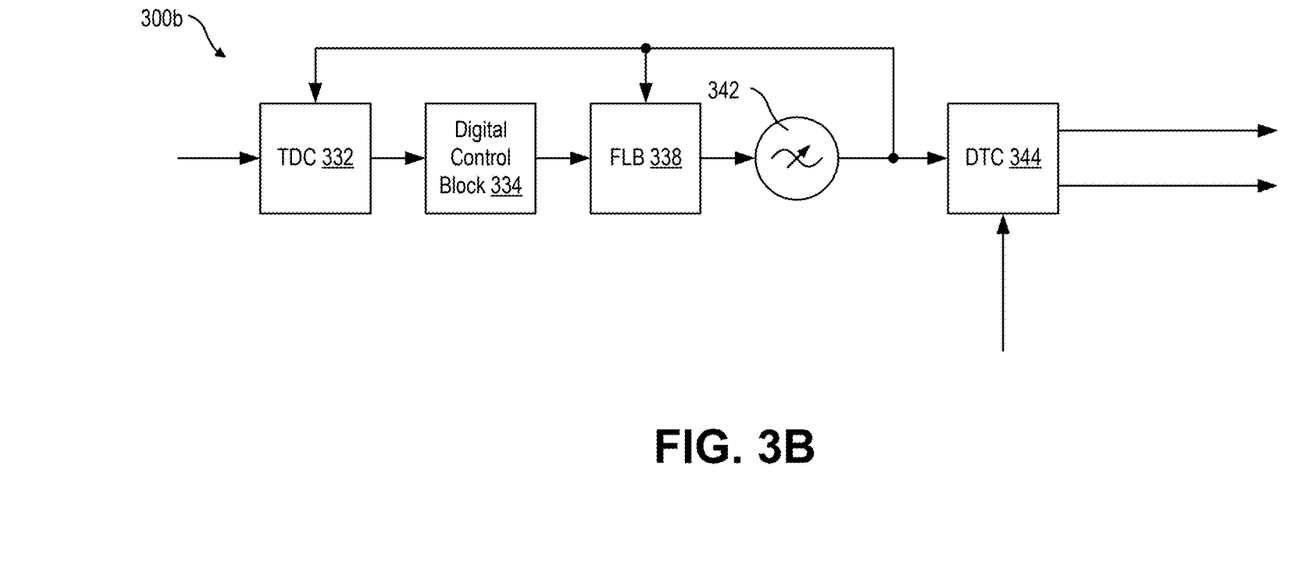

FIG. 3B illustrates a block diagram of an exemplary sweeper circuit 300b that may be implemented in the system 100 of FIG. 1, in accordance with at least one aspect described in the present disclosure. The sweeper circuit 300b may correspond to the first sweeper circuit 112 of FIG. 1.

The sweeper circuit 300b may include the TDC 332, the digital control block 334, the FLB 338, a 2xDCO 342, and a DTC 344. The TDC 332 may be electrically coupled to the output of the clock source 102 (not illustrated in FIG. 3B), an output of the 2xDCO 342, and the input of the digital control block 334. The digital control block 334 may be further electrically coupled to the input of the FLB 338. The FLB 338 may be further electrically coupled to an input of the 2xDCO 342 and the output of the 2xDCO 342. The DTC 344 may be electrically coupled to the output of the 2xDCO 342 and the output of the DFE 104 (not illustrated in FIG. 3B).

The TDC 332 may generate the quantized signal based on a continuous-wave signal and the clock signal. The quantized signal may represent a difference between a current phase of the continuous-wave signal and the phase of the clock signal. The TDC 332 may provide the quantized signal to the digital control block 334. The digital control block 334 may generate the correction signal based on the quantized signal. The digital control block 334 may provide the correction signal to the FLB 338. The FLB 338 may generate the driver signal based on the correction signal and the continuous-wave signal. The FLB 338 may provide the driver signal to the 2xDCO 342.

The 2xDCO 342 may generate the continuous-wave signal based on the driver signal. The 2xDCO 342 may provide the continuous-wave signal to the TDC 332, the FLB 338, and the DTC 344. The DTC 344 may generate the intermediate in-phase signal and the intermediate quadrature signal be modulating the continuous-wave signal based on the command signal and a pre-defined delay setting.

Figure 4A:
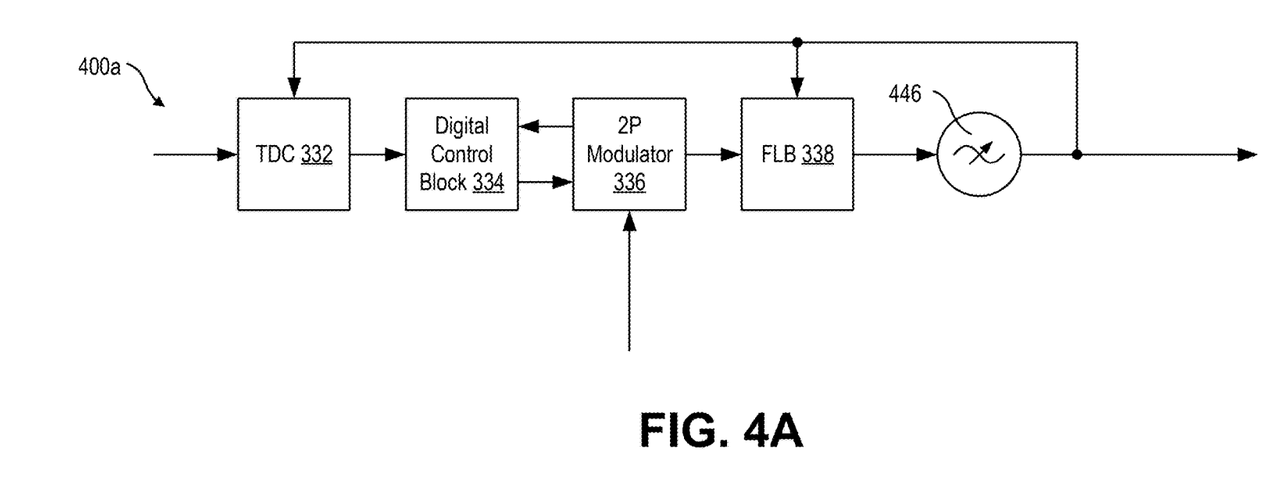
FIGS. 4A and 4B illustrate block diagrams of exemplary sweeper circuits that may be implemented in the systems of FIG. 1 and FIG. 2.

FIG. 4A illustrates a block diagram of an exemplary sweeper circuit 400a that may be implemented in the systems 100 and 200 of FIGS. 1 and 2, in accordance with at least one aspect described in the present disclosure. The sweeper circuit 400a may correspond to the second sweeper circuit 114 of FIG. 1 or the first sweeper circuit 209 or the second sweeper circuit 211 of FIG. 2.

The sweeper circuit 400a may include the TDC 332, the digital control block 334, the 2P modulator 336, the FLB 338, and a DCO 446. The DCO 446 may include a DCO or a 2xDCO. The TDC 332 may be electrically coupled to the output of the clock source 102 (not illustrated in FIG. 4A), an output of the DCO 446, and the input of the digital control block 334. The digital control block 334 may be further electrically coupled to the output of the 2P modulator 336 and the input of the 2P modulator 336. The 2P modulator 336 may be further electrically coupled to the input of the FLB 338, the output of the DCO 446, and the output of the DFE 104 (not illustrated in FIG. 4A). The FLB 338 may be further electrically coupled to an input of the DCO 446 and the output of the DCO 446.

The 2P modulator 336 may generate the low-pass command signal and the high pass command signal based on the command signal (e.g., the first command signal or the second command signal), the LO signal and the correction signal (e.g., the LO signal of FIG. 1 or the first LO signal or the second LO signal of FIG. 2). The low-pass command signal may indicate an intended phase of the LO signal. In addition, the 2P modulator 336 may provide the low-pass command signal to the digital control block 334. Further, the 2P modulator 338 may provide the high-pass command signal to the FLB 338.

The FLB 338 may generate the driver signal based on the high pass command signal and the LO signal. The DCO 446 may generate the LO signal based on the driver signal. The DCO 446 may provide the LO signal to the TDC 332, the 2P modulator 336, and the FLB 338.

The TDC 332 may generate the quantized signal based on the LO signal and the clock signal. The quantized signal may represent a difference between a current phase of the intermediate in-phase signal and a phase of the clock signal. The TDC 332 may provide the quantized signal to the digital control block 334. The digital control block 334 may generate the correction signal based on the quantized signal and the low-pass command signal. The correction signal may indicate a difference between the current phase of the intermediate in-phase signal and the intended phase of the intermediate in-phase signal.

Figure 4B:
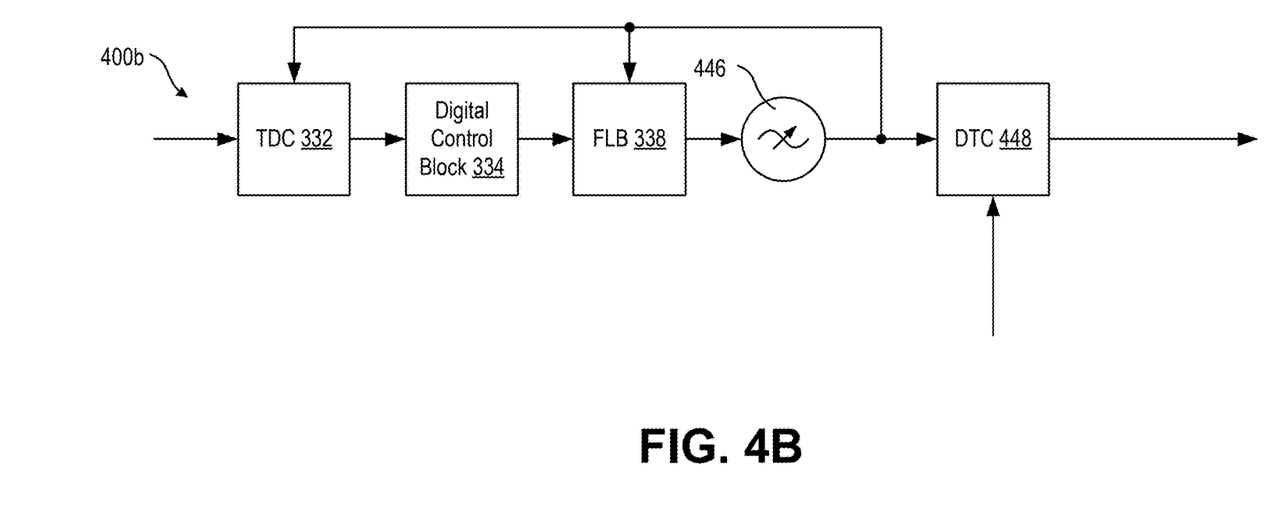

FIG. 4B illustrates a block diagram of an exemplary sweeper circuit 400b that may be implemented in the systems 100 and 200 of FIGS. 1 and 2, in accordance with at least one aspect described in the present disclosure. The sweeper circuit 400b may correspond to the second sweeper circuit 114 of FIG. 1 or the first sweeper circuit 209 or the second sweeper circuit 211 of FIG. 2.

The sweeper circuit 400b may include the TDC 332, the digital control block 334, the FLB 338, the DCO 446, and the DTC 344. The TDC 332 may be electrically coupled to the output of the clock source 102 (not illustrated in FIG. 4B), an output of the DCO 446, and the input of the digital control block 334. The digital control block 334 may be further electrically coupled to the input of the FLB 338. The FLB 338 may be further electrically coupled to the input of the DCO 446 and the output of the DCO 446. The DTC 344 may be electrically coupled to the output of the DCO 446 and the output of the DFE 104 (not illustrated in FIG. 4B).

The TDC 332 may generate the quantized signal based on the continuous-wave signal and the clock signal. The quantized signal may represent a difference between the current phase of the continuous-wave signal and the phase of the clock signal. The TDC 332 may provide the quantized signal to the digital control block 334. The digital control block 334 may generate the correction signal based on the quantized signal. The digital control block 334 may provide the correction signal to the FLB 338. The FLB 338 may generate the driver signal based on the correction signal and the continuous-wave signal. The FLB 338 may provide the driver signal to the DCO 446.

The DCO 446 may generate the continuous-wave signal based on the driver signal. The DCO 446 may provide the continuous-wave signal to the TDC 332 and the FLB 338. The DTC 344 may generate the LO signal by modulating the continuous-wave signal based on the command signal (e.g., the first command signal or the second command signal) and a pre-defined delay setting.

Figure 5:
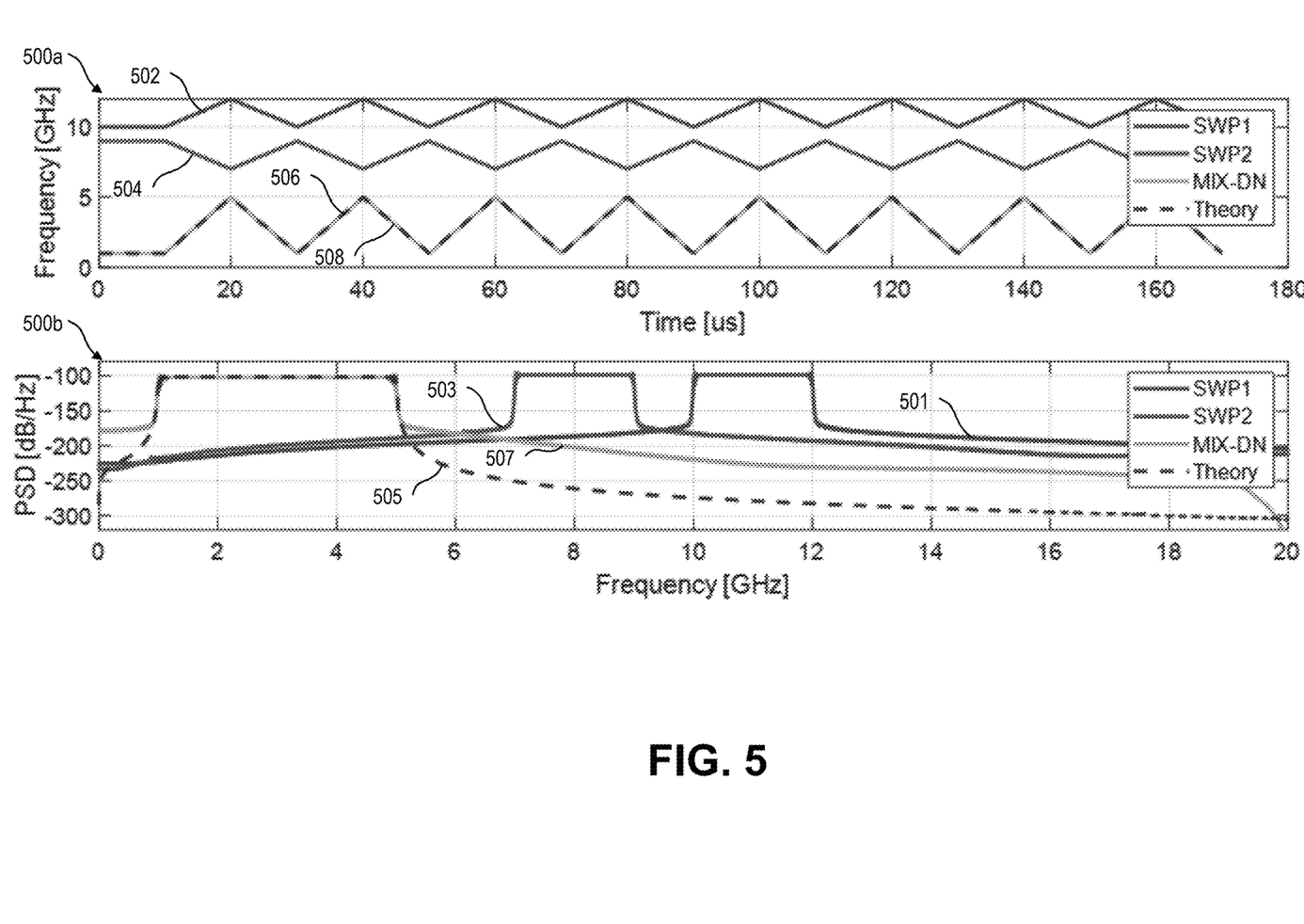
FIG. 5 illustrates graphical representations of a simulated time domain frequency evolution and a power spectral density (PSD) of various signals generated by the systems of FIGS. 1 and 2.

FIG. 5 illustrates graphical representations 500a and 500b of a simulated time domain frequency evolution and a power spectral density (PSD) of various signals generated by the systems 100 and 200 of FIGS. 1 and 2, in accordance with at least one aspect described in the present disclosure.

Curves 502, 504, 506, and 508 respectively represent a SWP1 signal (e.g., the intermediate in-phase signal, the quadrature signal, or the first LO signal), a SWP2 signal (e.g., the LO signal or the second LO signal), an expected signal, and a measured output signal. The simulation corresponding to FIG. 5 intended to generate a one to five gigahertz (GHz) triangularly swept single-tone signal that included a frequency slope rise time of ten micro seconds. In addition, a sweep partitioning of the SWP1 signal was to sweep frequencies between ten and twelve GHz and a sweep portioning of the SWP2 signal was to sweep between nine and seven GHz. The sweep portioning of the SWP1 signal and the SWP2 signal were reversed at each point in time during the simulation. Curves 501, 503, 505, and 507 respectively represent the resulting spectra of the SWP1 signal, the SWP2 signal, the expected signal, and the measured output signal.

Figure 6:
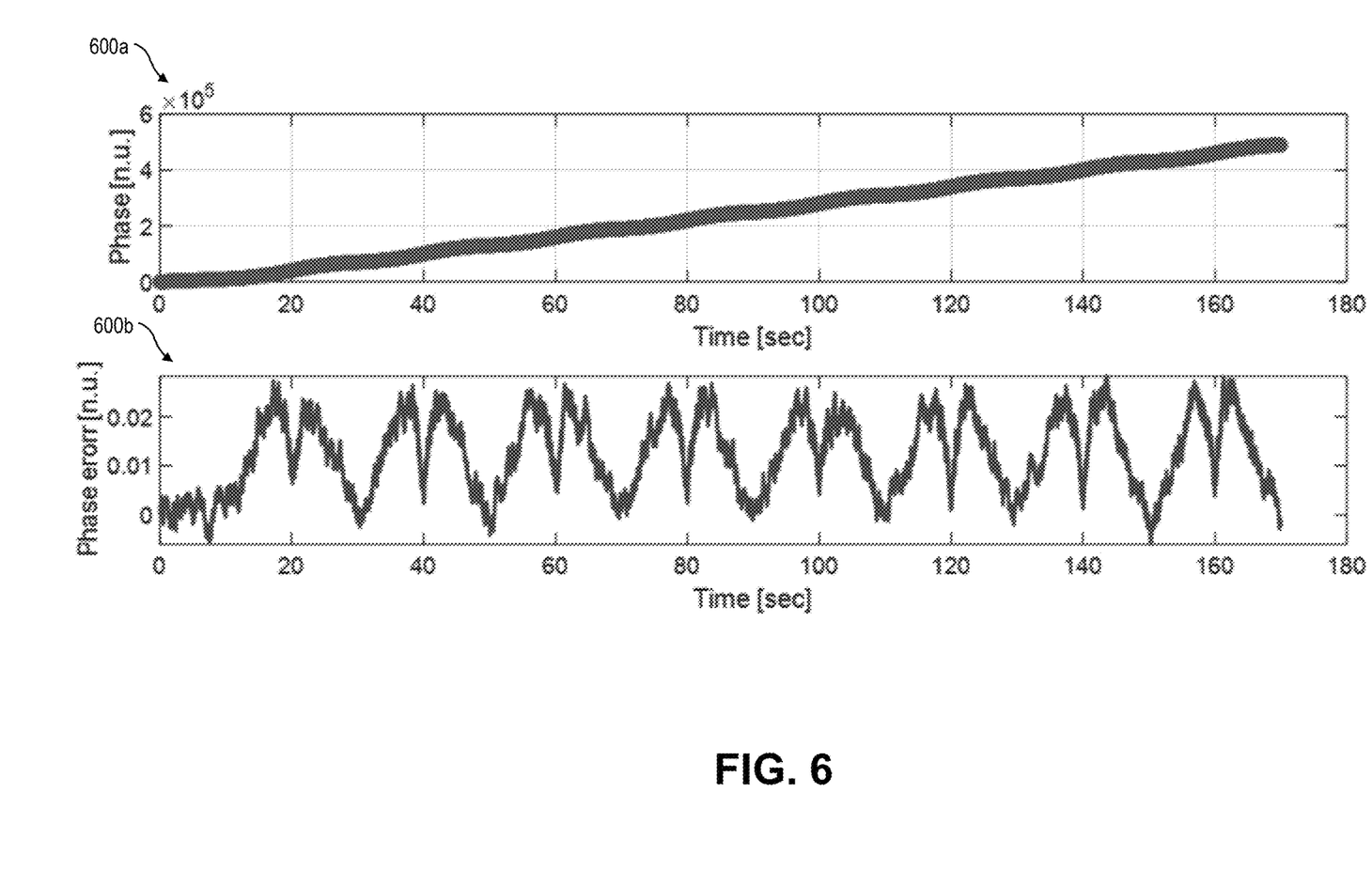
FIG. 6 illustrates graphical representations of a phase output and a time evolving phase error of a measured signal.

FIG. 6 illustrates graphical representations 600a and 600b of a phase output and a time evolving phase error of the measured signal, in accordance with at least one aspect described in the present disclosure. The graphical representations of the phase output 600a and the phase error 600b illustrate that an overall error of signals generated by the systems 100 and 200 of FIGS. 1 and 2 are bounded and remain low over time.

Figure 7:
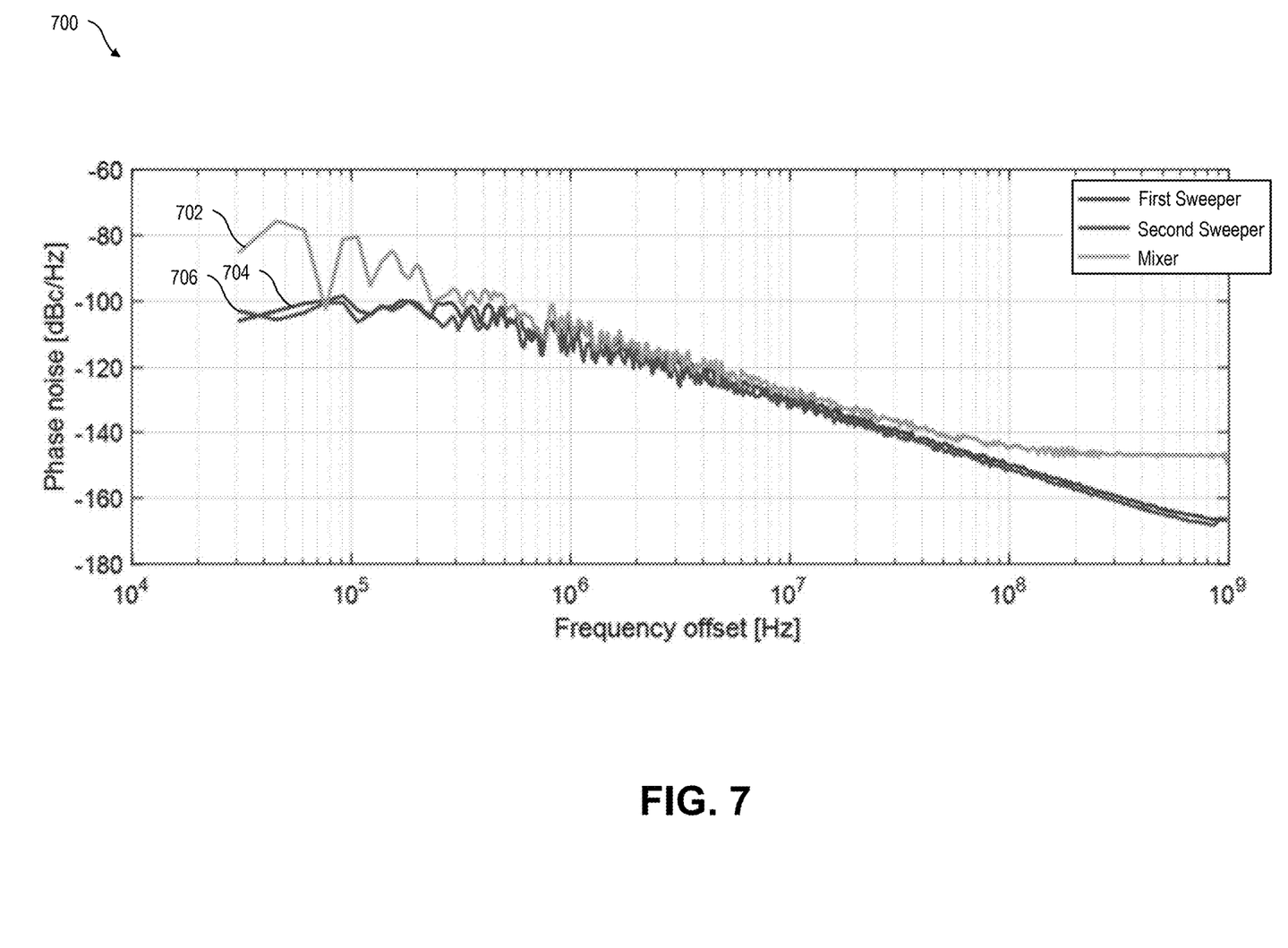
FIG. 7 illustrates a graphical representation of phase noise PSD of various signals generated by the systems of FIGS. 1 and 2, all according to at least one aspect described in the present disclosure.

FIG. 7 illustrates a graphical representation 700 of phase noise PSD of various signals generated by the systems 100 and 200 of FIGS. 1 and 2, in accordance with at least one aspect described in the present disclosure. Curves 702, 704, and 706 respectively represent the phase noise of a first sweeper signal (e.g., the intermediate in-phase signal, the quadrature signal, or the first LO signal), a second sweeper signal (e.g., the LO signal or the second LO signal), and a mixer signal (e.g., the mixed signal). The graphical representation 700 illustrates that a power sum of the noises of the individual signals.

A ranging device may perceive an environment proximate the ranging device using transmit signals (e.g., radio signals, light signals, or some combination thereof) and echo signals. The ranging device may include a light-based sensor (e.g., a LIDAR sensor), a radio-based sensor (e.g., a RADAR sensor), or some combination thereof to generate the transmit signals and receive the echo signals. The ranging device may include a FMCW radar device. In addition, the ranging device may include a millimeter-wave ranging device.

The RADAR sensor, the LIDAR sensor, or some combination thereof may include a frontend (e.g., a RADAR frontend, a LIDAR frontend, or some combination thereof), an antenna array, a processor (e.g., a RADAR processor, a LIDAR processor, or some combination thereof), or any other appropriate component for range detection. The frontend may generate an in-phase signal and a quadrature signal (e.g., chirp signals in which a frequency changes over time). The antenna array may be electrically coupled to the frontend and may transmit the transmit signals into the environment based on the in-phase signal and the quadrature signal. The transmit signals may be reflected by objects within the environment and received by the antenna array as the echo signals. The processor may calculate information including position, speed, direction, or any other appropriate data point of the objects within the environment with respect to the ranging device based on the echo signals.

Some aspects described in the present disclosure may generate the in-phase signal and the quadrature signal as synchronized signals. In addition, the in-phase signal and the quadrature signal may be generated by mixing outputs of a sweeper (e.g., counter swept frequency modulators). The sweeper may include an all-digital PLL architecture that includes either two-point injected modulation (e.g., direct) or DTC modulation (e.g., posterior). Any amplitude imbalance correction or pre-emphasis may follow the mixing and filtering.

The system may include a clock source (e.g., a single long-term stable clock source) that generates a clock signal to establish a common time reference for other components within the system. The clock source may include a quartz crystal clock source. The clock signal may establish the common time reference for a sweeper and a DFE within the system. The common time reference may ensure synchronous transfer of information from the DFE to the sweeper. The sweeper may include multiple frequency sweepers and the DFE may generate modulation commands for the frequency sweepers and amplification signals (e.g., a first amplification signal $P_I$ and a second amplification signal $P_Q$) for an amplifier of the system.

The DFE may generate a command signal. The command signal may include a first command signal (e.g., a first frequency modulation command $\Delta_1$) and a second command signal (e.g., a second frequency modulation command $\Delta_2$). The DFE may synchronously provide the first command signal and the second command signal to the sweeper. For example, the DFE may synchronously provide the first command signal to a first sweeper circuit of the sweeper and the second command signal to a second sweeper circuit of the sweeper.

The amplifier may include multiple DPA circuits to control amplitude of signals generated by the system. The DPA circuits may pre-emphasize the amplitudes based on an amplification setting. For example, the amplitude of the signals may be increased if the signals are high frequency signals to compensate for increased attenuation during transmission. As another example, the amplitude of the signals may be controlled based on differences in amplitude between the in-phase signal, the quadrature signal, the intermediate in-phase signal, the intermediate quadrature signal, or some combination thereof. The DPA circuits may amplify the amplitude based on the first amplification signal, the second amplification signal, and the amplification setting. For example a first DPA circuit may amplify the amplitude of an intermediate in-phase signal based on the first amplification signal and the amplification setting. As another example, a second DPA circuit may amplify the amplitude of an intermediate quadrature signal based on the second amplification signal and the amplification setting.

The sweeper may generate signals that are phase, frequency, or some combination thereof swept in opposite directions to increase the tunable range of the system. For example, the first sweeper circuit may generate the intermediate in-phase and the intermediate quadrature signal such that the frequencies of those signals are swept in an opposite direction as the frequency of the LO signal generated by the second sweeper circuit. As another example, the first sweeper circuit may generate the first LO signal such the frequency of the first LO signal is swept in an opposite direction as the frequency of the second LO signal generated by the second sweeper circuit.

The first sweeper circuit may generate the intermediate in-phase signal and the intermediate quadrature signal as phase locked signals. The first sweeper circuit may include a direct quadrature DCO. Alternatively, the first sweeper circuit may include a 2×DCO and a DTC that performs division of a positive oscillating node and a negative oscillating node. The 2×DCO may generate signals at two times the LO frequency sweep command signal may be pre-scaled into a 2×domain. The DTC may manipulate edges of the intermediate in-phase signal and the intermediate quadrature signal so as to operate as a frequency divider.

The second sweeper circuit may include a 2P modulator that receives the second command signal. The 2P modulator may translate the second command signal into a low-pass command signal and a high-pass command signal. The 2P modulator may synchronously provide the low-pass command to a frequency correction power of a digital control block of the second sweeper circuit and the high-pass command to the FLB of the second sweeper circuit. The 2P modulator may interpolate and synchronously provide the low-pass command and the high-pass command based on the clock signal. The 2P modulator may interpolate and synchronize the high-pass command onto the modulated DCO time-grid. The high-pass command signal may be interpolated at modulated LO (MOLO) rate.

The 2P modulator may provide the high-pass command signal (e.g., the interpolated command signal) to the FLB. The FLB may generate a driver signal that regulates a capacitor setting of the DCO based on the high-pass command. The capacitor setting may regulate an oscillation frequency of the DCO. The FLB may translate the high-pass command into a varactor configuration. The FLB may include digital components, analog components, or some combination thereof. The DCO may generate the LO signal based on the driver signal.

The TDC may quantize the LO signal to generate a quantized signal. The TDC may provide the quantized signal to the digital control block to process and generate a correction signal (e.g., a correction command signal).

The second sweeper circuit may include a posterior phase modulation scheme that includes a DTC. The DTC may adjust an edge delay of the LO signal based on the clock signal and a digital input word (e.g., the command signal). The DTC may accumulate the command signal into a phase modulation word, which is converted into a pre-distorted DTC settings value. The pre-distorted settings value may be based on a pre-calibrated delay state. The pre-distorted settings value may mitigate non-linearity of the DTC.

A mixer may mix the output signals of the sweeper. The mixer may mix the intermediate in-phase signal and the LO signal to generate a mixed in-phase signal. The mixer may also mix the intermediate quadrature signal and the LO signal to generate a mixed quadrature signal. Further, the mixer may mix the first LO signal and the second LO signal to generate a mixed signal. The mixer may include a down-conversion mixer. The mixer may include a first mixer circuit and a second mixer circuit each configured as down conversion mixers. The amplifier may filter out high pass portions of the mixed signals to generate the in-phase signal and the quadrature signal as down converted signals.

The system may include a clock source, a sweeper, a DFE, a mixer, and an amplifier. The system may be configured as a frequency ramp generator that generates an in-phase signal and a quadrature signal as frequency ramp signals for range detection of an object.

The clock source may generate a clock signal. An intermediate in-phase signal, an intermediate quadrature signal, and a LO signal may be based on the clock signal and a command signal. The intermediate in-phase signal, the intermediate quadrature signal, and the LO signal may be aligned to the clock signal. The clock signal may ensure that the DFE and the sweeper are synced to a common reference time-base.

The DFE may generate the command signal. The DFE may generate a first command signal and a second command signal. The command signal may include the first command signal and the second command signal. In addition, the DFE may generate a first amplification signal, and a second amplification signal. The DFE may synchronously provide the first command signal and the second command signal to the sweeper based on the clock signal.

The sweeper may include an all-digital PLL architecture. The sweeper may generate an intermediate in-phase signal, an intermediate quadrature signal, and a LO signal based on the command signal and the clock signal. The sweeper may include a first sweeper circuit and a second sweeper circuit. The first sweeper circuit may generate the intermediate in-phase signal and the intermediate quadrature signal based on the first command signal and the clock signal. The second sweeper circuit may generate the LO signal based on the second command signal and the clock signal.

The first sweeper circuit may modulate a phase of the intermediate in-phase signal and a phase of the intermediate quadrature signal. The second sweeper circuit may modulate a phase of the LO signal. The second sweeper circuit may modulate the phase of the LO signal to cause the frequency of the LO signal to sweep in a direction opposite the frequency of the intermediate in-phase signal and the frequency of the intermediate quadrature signal.

The first sweeper circuit may include a 2P modulator, a FLB, a DCO, a digital control block, and a TDC. The 2P modulator may generate a low-pass command signal and a high pass command signal based on the command signal, a correction signal, and the intermediate in-phase signal. The low-pass command signal may indicate an intended phase of the intermediate in-phase signal. The FLB may generate a driver signal based on the high pass command signal and the intermediate in-phase signal. The DCO may generate the intermediate in-phase signal and the intermediate quadrature signal based on the driver signal.

The TDC may generate a quantized signal based on the intermediate in-phase signal and based on the clock signal. The quantized signal may represent a difference between a current phase of the intermediate in-phase signal and a phase of the clock signal. The digital control block may generate the correction signal based on the quantized signal and based on the low-pass command signal. The correction signal may indicate a difference between the current phase of the intermediate in-phase signal and the intended phase of the intermediate in-phase signal.

The first sweeper circuit may include the TDC, the digital control block, the FLB, a 2×DCO, and a DTC. The TDC may generate the quantized signal based on a continuous-wave signal and the clock signal. The quantized signal may represent a difference between a current phase of the continuous-wave signal and the phase of the clock signal. The digital control block may generate the correction signal based on the quantized signal. The FLB may generate the driver signal based on the correction signal and the continuous-wave signal. The 2×DCO may generate the continuous-wave signal based on the driver signal. The DTC may generate the intermediate in-phase signal and the intermediate quadrature signal by modulating the continuous-wave signal based on the command signal and a pre-defined delay setting.

The second sweeper circuit may include the 2P modulator, the FLB, the DCO, the TDC, and the digital control block. The 2P modulator may generate the low-pass command signal and the high pass command signal based on the command signal, the correction signal, and the LO signal. The low-pass command signal may indicate an intended phase of the LO signal. The FLB may generate the driver signal based on the high pass command signal and the LO signal. The DCO may include a 2×DCO. The DCO may generate the LO signal based on the driver signal. The TDC may generate the quantized signal based on the LO signal and based on the clock signal. The quantized signal may represent a difference between a current phase of the LO signal and the phase of the clock signal. The digital control block may generate the correction signal based on the quantized signal and based on the low-pass command signal. The correction signal may indicate the difference between the current phase of the LO signal and the intended phase of the LO signal.

The second sweeper circuit may include the TDC, the digital control block, the FLB, the DCO, and the DTC. The TDC may generate the quantized signal based on the continuous-wave signal and based on the clock signal. The quantized signal may represent the difference between the current phase of the continuous-wave signal and the phase of the clock signal. The digital control block may generate the correction signal based on the quantized signal. The FLB may generate the driver signal based on the correction signal and based on the continuous-wave signal. The DCO may generate the continuous-wave signal based on the driver signal. The DTC may generate the LO signal by modulating the continuous-wave signal based on the command signal and based on a pre-defined delay setting.

The mixer may generate a mixed in-phase signal based on the intermediate in-phase signal and the LO signal. The mixer may also generate a mixed quadrature signal based on the intermediate quadrature signal and the LO signal. The mixer may include a first mixer circuit and a second mixer circuit. The first mixer circuit may mix the intermediate in-phase signal and the LO signal. The second mixer circuit may mix the intermediate quadrature signal and the LO signal. The first mixer circuit and the second mixer circuit may be configured as down conversion mixers.

The amplifier may generate the in-phase signal based on the mixed in-phase signal and an amplification setting. The amplifier may also generate the quadrature signal based on the mixed quadrature signal and the amplification setting. The amplifier may include a first DPA circuit, a second DPA circuit, a first LPF, and a second LPF.

The first DPA circuit may amplify an amplitude of the mixed in-phase signal based on the amplification setting, the first amplification signal, or some combination thereof. The second DPA circuit may amplify an amplitude of the mixed quadrature signal based on the amplification setting, the second amplification signal, or some combination thereof. The first LPF may filter out a high pass portion of the mixed in-phase signal to generate the in-phase signal including the amplified amplitude. The second LPF may filter out a high pass portion of the mixed quadrature signal to generate the quadrature signal including the amplified amplitude.

The system may include a clock source, a sweeper, a DFE, a mixer, a DIV2, and an amplifier. The system may be configured as a frequency ramp generator and the in-phase signal and the quadrature signal may be generated as frequency ramp signals for range detection of an object.

The clock source may generate a clock signal. A first LO signal and a second LO signal may be based on the clock signal and a command signal. The clock signal may ensure that the DFE and the sweeper are synced to a common reference time-base.

The DFE may generate the command signal. The DFE may generate a first command signal and a second command signal. The command signal may include the first command signal and the second command signal. The DFE may generate a first amplification signal and a second amplification signal. The DFE may synchronously provide the first command signal and the second command signal to the sweeper based on the clock signal.

The sweeper may include an all-digital PLL architecture. The sweeper may generate a first LO signal and a second LO signal based on the command signal. The sweeper may include a first sweeper circuit and a second sweeper circuit. The first sweeper circuit may generate the first LO signal based on the first command signal. The second sweeper circuit may generate the second LO signal based on the second command signal. The first sweeper circuit may modulate a phase of the first LO signal. The second sweeper circuit may modulate a phase of the second LO signal. The second sweeper circuit may modulate the phase of the second LO signal to cause the frequency of the second LO signal to sweep in a direction opposite the frequency of the first LO signal.

The first sweeper circuit may include a first TDC, a first digital control block, a first FLB, a first 2×DCO, and a first DTC. The first TDC may generate a first quantized signal based on a first continuous-wave signal and a clock signal. The first quantized signal may represent a difference between a current phase of the first continuous-wave signal and a phase of the clock signal. The first digital control block may generate a first correction signal based on the first quantized signal. The first FLB may generate a first driver signal based on the first correction signal and the first continuous-wave signal. The first 2×DCO may generate the first continuous-wave signal based on the first driver signal. The first DTC may generate the first LO signal by modulating the first continuous-wave signal based on the command signal and a pre-defined delay setting.

The second sweeper circuit may include a second TDC, a second digital control block, a second FLB, a second 2×DCO, and a second DTC. The second TDC may generate a second quantized signal based on a second continuous-wave signal and the clock signal. The second quantized signal may represent a difference between a current phase of the second continuous-wave signal and the phase of the clock signal. The second digital control block may generate a second correction signal based on the second quantized signal. The second FLB may generate a second driver signal based on the second correction signal and the second continuous-wave signal. The second 2×DCO may generate the second continuous-wave signal based on the second driver signal. The second DTC may generate the second LO signal by modulating the second continuous-wave signal based on the command signal and a pre-defined delay setting.

The second sweeper circuit may include a 2P modulator, the second FLB, the second 2×DCO, the second TDC, and the second digital control block. The 2P modulator may generate a low-pass command signal and a high pass command signal based on the command signal, the second correction signal, and the second LO signal. The low-pass command signal may indicate the intended phase of the second LO signal. The second FLB may generate the second driver signal based on the high pass command signal and the second LO signal. The second 2×DCO may generate the second LO signal based on the second driver signal. The second TDC may generate the second quantized signal based on the second LO signal and based on the clock signal. The second quantized signal may represent the difference between the current phase of the second LO signal and the phase of the clock signal. The second digital control block may generate the second correction signal based on the second quantized signal and based on the low-pass command signal. The second correction signal may indicate the difference between the current phase of the second LO signal and the intended phase of the second LO signal.

The mixer may be configured as a down conversion mixer. The mixer may generate a mixed signal based on the first LO signal and the second LO signal. The mixer may mix the first LO signal and the second LO signal to generate the mixed signal. The DIV2 may generate an intermediate in-phase signal and an intermediate quadrature signal based on the mixed signal. The DIV2 may generate the intermediate in-phase signal based on a rising edge of the mixed signal. Alternatively, the DIV2 may generate the intermediate in-phase signal based on a falling edge of the mixed edge signal. The DIV2 may generate the intermediate quadrature signal based on the rising edge of the mixed signal. Alternatively, the DIV2 may generate the intermediate quadrature signal based on the falling edge of the mixed edge signal. The DIV2 may ensure phase alignment of the intermediate in-phase signal and the intermediate quadrature signal.

The DIV2 may divide the frequency of the mixed signal to generate the intermediate in-phase signal and the intermediate quadrature signal that includes half as many edges (e.g., half as many rising edges and half as many falling edges) as the mixed signal. The DIV2 may generate the intermediate in-phase signal and the intermediate quadrature signal at a frequency that is roughly equal to half the frequency of the mixed signal.

The amplifier may generate the in-phase signal based on the intermediate in-phase signal and an amplification setting. The amplifier may also generate the quadrature signal based on the intermediate quadrature signal and the amplification setting. The amplifier may include a first DPA circuit, a second DPA circuit, a first LPF, and a second LPF. The first DPA circuit may amplify an amplitude of the intermediate in-phase signal based on the amplification setting, the first amplification signal, or some combination thereof. The second DPA circuit may amplify an amplitude of the intermediate quadrature signal based on the amplification setting, the second amplification signal, or some combination thereof.

The first LPF may filter out a high pass portion of the intermediate in-phase signal to generate the in-phase signal including the amplified amplitude. The second LPF may filter out a high pass portion of the intermediate quadrature signal to generate the quadrature signal including the amplified amplitude.

The system may include a clock source, a DFE, a sweeper, a mixer, and an amplifier. The sweeper may be electrically coupled to an output of the DFE. The mixer may be electrically coupled to an output of the sweeper. The amplifier may be electrically coupled to an output of the mixer and an output of the DFE.

The sweeper may include a first sweeper circuit and a second sweeper circuit. The first sweeper circuit may be electrically coupled to the output of the DFE and an input of the mixer. The second sweeper circuit may be electrically coupled to the output of the DFE and the input of the mixer.

The mixer may include a first mixer circuit and a second mixer circuit. The first mixer circuit may be electrically coupled to the output of the sweeper and an input of the amplifier. The second mixer circuit may be electrically coupled to the output of the sweeper and the input of the amplifier.

The amplifier may include a first DPA circuit, a second DPA circuit, a first LPF, and a second LPF. The first DPA circuit may be electrically coupled to the output of the mixer. The second DPA circuit may be electrically coupled to the output of the mixer. The first LPF may be electrically coupled to an output of the first DPA circuit. The second LPF may be electrically coupled to an output of the second DPA circuit.

The clock source may be electrically coupled to an input of the DFE and an input of the sweeper.

Example 1 may include a system including: a DFE configured to generate a command signal; a sweeper configured to generate an intermediate in-phase signal, an intermediate quadrature signal, and a LO signal based on the command signal; a mixer configured to: generate a mixed in-phase signal based on the intermediate in-phase signal and the LO signal; and generate a mixed quadrature signal based on the intermediate quadrature signal and the LO signal; and an amplifier configured to: generate an in-phase signal based on the mixed in-phase signal and an amplification setting; and generate a quadrature signal based on the mixed quadrature signal and the amplification setting.

Example 2 may include the system of example 1, wherein the DFE is configured to: generate a first command signal; and generate a second command signal, wherein the command signal includes the first command signal and the second command signal.

Example 3 may include the system of example 2, wherein the sweeper includes: a first sweeper circuit configured to generate the intermediate in-phase signal and the intermediate quadrature signal based on the first command signal; and a second sweeper circuit configured to generate the LO signal based on the second command signal.

Example 4 may include the system of any of examples 1 and 2, wherein the sweeper includes: a first sweeper circuit configured to generate the intermediate in-phase signal and the intermediate quadrature signal based on the command signal; and a second sweeper circuit configured to generate the LO signal based on the command signal.

Example 5 may include the system of any of examples 3 and 4, wherein: the first sweeper circuit is configured to modulate a phase of the intermediate in-phase signal and a phase of the intermediate quadrature signal; and the second sweeper circuit is configured to modulate a phase of the LO signal, wherein the second sweeper circuit is configured to modulate the phase of the LO signal to cause the frequency of the LO signal to sweep in a direction opposite the frequency of the intermediate in-phase signal and the frequency of the intermediate quadrature signal.

Example 6 may include the system of any of examples 1-5, wherein the sweeper includes an all-digital phase lock loop architecture.

Example 7 may include the system of any of examples 1-6, wherein the mixer includes: a first mixer circuit configured to mix the intermediate in-phase signal and the LO signal; and a second mixer circuit configured to mix the intermediate quadrature signal and the LO signal.

Example 8 may include the system of example 7, wherein the first mixer circuit and the second mixer circuit are configured as down conversion mixers.

Example 9 may include the system of any of examples 1-8, wherein the amplifier includes: a first DPA circuit configured to amplify an amplitude of the mixed in-phase signal based on the amplification setting; and a second DPA circuit configured to amplify an amplitude of the mixed quadrature signal based on the amplification setting.

Example 10 may include the system of example 9, wherein the DFE is further configured to: generate a first amplification signal, wherein the first DPA circuit is further configured to amplify the amplitude of the mixed in-phase signal based on the first amplification signal; and generate a second amplification signal, wherein the second DPA circuit is further configured to amplify the amplitude of the mixed quadrature signal based on the second amplification signal.

Example 11 may include the system of example 10, wherein the amplifier further includes: a first low-pass filter configured to filter out a high pass portion of the mixed in-phase signal to generate the in-phase signal including the amplified amplitude; and a second low-pass filter configured to filter out a high pass portion of the mixed quadrature signal to generate the quadrature signal including the amplified amplitude.

Example 12 may include the system of any of examples 1-11, wherein: the system further includes a clock source configured to generate a clock signal; and the intermediate in-phase signal, the intermediate quadrature signal, and the LO signal are further based on the clock signal.

Example 13 may include the system of example 12, wherein the clock signal ensures the DFE and the sweeper are synced to a common reference time-base.

Example 14 may include the system of any of examples 12 and 13, wherein the DFE is configured to: generate a first command signal and a second command signal, wherein the command signal includes the first command signal and the second command signal; and synchronously provide the first command signal and the second command signal to the sweeper based on the clock signal.

Example 15 may include the system of any of examples 1-14, wherein the sweeper includes a second sweeper circuit including: a two-point modulator configured to generate a low-pass command signal and a high pass command signal based on the command signal, a correction signal, and the LO signal, wherein the low-pass command signal indicates an intended phase of the LO signal; a fast logic block configured to generate a driver signal based on the high pass command signal and the LO signal; a DCO configured to generate the LO signal based on the driver signal; a TDC configured to generate a quantized signal based on the LO signal and based on a clock signal, wherein the quantized signal represents a difference between a current phase of the LO signal and a phase of the clock signal; and a digital control block configured to generate the correction signal based on the quantized signal and based on the low-pass command signal, wherein the correction signal indicates a difference between the current phase of the LO signal and the intended phase of the LO signal.

Example 16 may include the system of any of examples 1-14, wherein the sweeper includes a second sweeper circuit including: a TDC configured to generate a quantized signal based on a continuous-wave signal and based on a clock signal, wherein the quantized signal represents a difference between a current phase of the continuous-wave signal and a phase of the clock signal; a digital control block configured to generate a correction signal based on the quantized signal; a fast logic block configured to generate a driver signal based on the correction signal and based on the continuous-wave signal; a DCO configured to generate the continuous-wave signal based on the driver signal; and a DTC configured to generate the LO signal by modulating the continuous-wave signal based on the command signal and based on a pre-defined delay setting.

Example 17 may include the system of any of examples 1-16, wherein the sweeper includes a first sweeper circuit including: a two-point modulator configured to generate a low-pass command signal and a high pass command signal based on the command signal, a correction signal, and the intermediate in-phase signal, wherein the low-pass command signal indicates an intended phase of the intermediate in-phase signal; a fast logic block configured to generate a driver signal based on the high pass command signal and the intermediate in-phase signal; a DCO configured to generate the intermediate in-phase signal and the intermediate quadrature signal based on the driver signal; a TDC configured to generate a quantized signal based on the intermediate in-phase signal and based on a clock signal, wherein the quantized signal represents a difference between a current phase of the intermediate in-phase signal and a phase of the clock signal; and a digital control block configured to generate the correction signal based on the quantized signal and based on the low-pass command signal, wherein the correction signal indicates a difference between the current phase of the intermediate in-phase signal and the intended phase of the in-phase signal.

Example 18 may include the system of any of examples 1-16, wherein the sweeper includes a first sweeper circuit including: a TDC configured to generate a quantized signal based on a continuous-wave signal and a clock signal, wherein the quantized signal represents a difference between a current phase of the continuous-wave signal and a phase of the clock signal; and a digital control block configured to generate a correction signal based on the quantized signal; a fast logic block configured to generate a driver signal based on the correction signal and the continuous-wave signal; a 2×DCO configured to generate the continuous-wave signal based on the driver signal; and a DTC configured to generate the intermediate in-phase signal and the intermediate quadrature signal by modulating the continuous-wave signal based on the command signal and a pre-defined delay setting.

Example 19 may include the system of any of examples 1-18, wherein the system is configured as a frequency ramp generator and the in-phase signal and the quadrature signal are generated as frequency ramp signals for range detection of an object.

Example 20 may include a system including: a DFE configured to generate a command signal; a sweeper configured to generate a first LO signal and a second LO signal based on the command signal; a mixer configured to generate a mixed signal based on the first LO signal and the second LO signal; a divide-by-two frequency divider configured to generate an intermediate in-phase signal and an intermediate quadrature signal based on the mixed signal; an amplifier configured to: generate an in-phase signal based on the intermediate in-phase signal and an amplification setting; and generate a quadrature signal based on the intermediate quadrature signal and the amplification setting.

Example 21 may include the system of example 20, wherein the DFE is configured to: generate a first command signal; and generate a second command signal, wherein the command signal includes the first command signal and the second command signal.

Example 22 may include the system of example 21, wherein the sweeper includes: a first sweeper circuit configured to generate the first LO signal based on the first command signal; and a second sweeper circuit configured to generate the second LO signal based on the second command signal.

Example 23 may include the system of any of examples 20 and 22, wherein the sweeper includes: a first sweeper circuit configured to generate the first LO signal based on the command signal; and a second sweeper circuit configured to generate the second LO signal based on the command signal.

Example 24 may include the system of any of examples 22 and 23, wherein: the first sweeper circuit is configured to modulate a phase of the first LO signal; and the second sweeper circuit is configured to modulate a phase of the second LO signal, wherein the second sweeper circuit is configured to modulate the phase of the second LO signal to cause the frequency of the second LO signal to sweep in a direction opposite the frequency of the first LO signal.

Example 25 may include the system of any of examples 20-24, wherein the sweeper includes an all-digital phase lock loop architecture.

Example 26 may include the system of example 20, wherein the mixer is configured as a down conversion mixer.

Example 27 may include the system of any of examples 20-26, wherein the amplifier includes: a first DPA circuit configured to amplify an amplitude of the intermediate in-phase signal based on the amplification setting; and a second DPA circuit configured to amplify an amplitude of the intermediate quadrature signal based on the amplification setting.

Example 28 may include the system of example 27, wherein the DFE is further configured to: generate a first amplification signal, wherein the first DPA circuit is further configured to amplify the amplitude of the intermediate in-phase signal based on the first amplification signal; and generate a second amplification signal, wherein the second DPA circuit is further configured to amplify the amplitude of the intermediate quadrature signal based on the second amplification signal.

Example 29 may include the system of example 28, wherein the amplifier further includes: a first low-pass filter configured to filter out a high pass portion of the intermediate in-phase signal to generate the in-phase signal including the amplified amplitude; and a second low-pass filter configured to filter out a high pass portion of the intermediate quadrature signal to generate the quadrature signal including the amplified amplitude.

Example 30 may include the system of any of examples 20-29, wherein: the system further includes a clock source configured to generate a clock signal; and the first LO signal and the second LO signal are further based on the clock signal.

Example 31 may include the system of example 30, wherein the clock signal ensures the DFE and the sweeper are synced to a common reference time-base.

Example 32 may include the system of any of examples 30 and 31, wherein the DFE is configured to: generate a first command signal and a second command signal, wherein the command signal includes the first command signal and the second command signal; and synchronously provide the first command signal and the second command signal to the sweeper based on the clock signal.

Example 33 may include the system of any of examples 20-32, wherein the sweeper includes a first sweeper circuit including: a first TDC configured to generate a first quantized signal based on a first continuous-wave signal and a clock signal, wherein the first quantized signal represents a difference between a current phase of the first continuous-wave signal and a phase of the clock signal; a first digital control block configured to generate a first correction signal based on the first quantized signal; a first fast logic block configured to generate a first driver signal based on the first correction signal and the first continuous-wave signal; a first 2×DCO configured to generate the first continuous-wave signal based on the first driver signal; and a first DTC configured to generate the first LO signal by modulating the first continuous-wave signal based on the command signal and a pre-defined delay setting.

Example 34 may include the system of any of examples 20-33, wherein the sweeper includes a second sweeper circuit including: a second TDC configured to generate a second quantized signal based on a second continuous-wave signal and a clock signal, wherein the second quantized signal represents a difference between a current phase of the second continuous-wave signal and a phase of the clock signal; and a second digital control block configured to generate a second correction signal based on the second quantized signal; a second fast logic block configured to generate a second driver signal based on the second correction signal and the second continuous-wave signal; a second 2×DCO configured to generate the second continuous-wave signal based on the second driver signal; and a second DTC configured to generate the second LO signal by modulating the second continuous-wave signal based on the command signal and a pre-defined delay setting.

Example 35 may include the system of any of examples 20-33, wherein the sweeper includes a second sweeper circuit including: a two-point modulator configured to generate a low-pass command signal and a high pass command signal based on the command signal, a second correction signal, and the second LO signal, wherein the low-pass command signal indicates an intended phase of the second LO signal; a second fast logic block configured to generate a second driver signal based on the high pass command signal and the second LO signal; a second 2×DCO configured to generate the second LO signal based on the second driver signal; a second TDC configured to generate a second quantized signal based on the second LO signal and based on a clock signal, wherein the second quantized signal represents a difference between a current phase of the second LO signal and a phase of the clock signal; and a second digital control block configured to generate the second correction signal based on the second quantized signal and based on the low-pass command signal, wherein the second correction signal indicates a difference between the current phase of the second LO signal and the intended phase of the second LO signal.

Example 36 may include the system of any of examples 20-35, wherein the system is configured as a frequency ramp generator and the in-phase signal and the quadrature signal are generated as frequency ramp signals for range detection of an object.

Example 37 may include a system including: a DFE; a sweeper electrically coupled to an output of the DFE; a mixer electrically coupled to an output of the sweeper; and an amplifier electrically coupled to an output of the mixer and an output of the DFE.

Example 38 may include the system of example 37, wherein the sweeper includes: a first sweeper circuit electrically coupled to the output of the DFE and an input of the mixer; and a second sweeper circuit electrically coupled to the output of the DFE and the input of the mixer.

Example 39 may include the system of any of examples 37 and 38, wherein the mixer includes: a first mixer circuit electrically coupled to the output of the sweeper and an input of the amplifier; and a second mixer circuit electrically coupled to the output of the sweeper and the input of the amplifier.

Example 40 may include the system of any of examples 37-39, wherein the amplifier includes: a first DPA circuit electrically coupled to the output of the mixer; and a second DPA circuit electrically coupled to the output of the mixer.

Example 41 may include the system of example 40, wherein the amplifier further includes: a first low-pass filter electrically coupled to an output of the first DPA circuit; and a second low-pass filter electrically coupled to an output of the second DPA circuit.

Example 42 may include the system of any of examples 37-41, wherein the system further includes a clock source electrically coupled to an input of the DFE and an input of the sweeper.

As used in the present disclosure, terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to aspects containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although aspects of the present disclosure have been described in detail, various changes, substitutions, and alterations could be made hereto without departing from the spirit and scope of the present disclosure.

What is claimed is:

1. A system comprising:
a digital front-end (DFE) configured to generate a command signal;
a sweeper configured to generate an intermediate in-phase signal, an intermediate quadrature signal, and a local oscillator (LO) signal based on the command signal;
a mixer configured to:
generate a mixed in-phase signal based on the intermediate in-phase signal and the LO signal; and
generate a mixed quadrature signal based on the intermediate quadrature signal and the LO signal; and
an amplifier configured to:
generate an in-phase signal based on the mixed in-phase signal and an amplification setting; and
generate a quadrature signal based on the mixed quadrature signal and the amplification setting.

2. The system of claim 1, wherein the DFE is configured to:
generate a first command signal; and
generate a second command signal, wherein the command signal comprises the first command signal and the second command signal.

3. The system of claim 2, wherein the sweeper comprises:
a first sweeper circuit configured to generate the intermediate in-phase signal and the intermediate quadrature signal based on the first command signal; and
a second sweeper circuit configured to generate the LO signal based on the second command signal.

4. The system of claim 1, wherein the sweeper comprises:
a first sweeper circuit configured to generate the intermediate in-phase signal and the intermediate quadrature signal based on the command signal; and a second sweeper circuit configured to generate the LO signal based on the command signal.

5. The system of claim 3, wherein:
the first sweeper circuit is configured to modulate a phase of the intermediate in-phase signal and a phase of the intermediate quadrature signal; and
the second sweeper circuit is configured to modulate a phase of the LO signal, wherein the second sweeper circuit is configured to modulate the phase of the LO signal to cause the frequency of the LO signal to sweep in a direction opposite the frequency of the intermediate in-phase signal and the frequency of the intermediate quadrature signal.

6. The system of claim 1, wherein the mixer comprises:
a first mixer circuit configured to mix the intermediate in-phase signal and the LO signal; and
a second mixer circuit configured to mix the intermediate quadrature signal and the LO signal.

7. The system of claim 1, wherein the amplifier comprises:
a first digital power amplifier (DPA) circuit configured to amplify an amplitude of the mixed in-phase signal based on the amplification setting; and
a second DPA circuit configured to amplify an amplitude of the mixed quadrature signal based on the amplification setting.

8. A system comprising:
a digital front-end (DFE) configured to generate a command signal;
a sweeper configured to generate a first local oscillator (LO) signal and a second LO signal based on the command signal;
a mixer configured to generate a mixed signal based on the first LO signal and the second LO signal;
a divide-by-two frequency divider configured to generate an intermediate in-phase signal and an intermediate quadrature signal based on the mixed signal;
an amplifier configured to:
generate an in-phase signal based on the intermediate in-phase signal and an amplification setting; and
generate a quadrature signal based on the intermediate quadrature signal and the amplification setting.

9. The system of claim 8, wherein the sweeper comprises:
a first sweeper circuit configured to generate the first LO signal based on the command signal; and
a second sweeper circuit configured to generate the second LO signal based on the command signal.

10. The system of claim 8, wherein:
the first sweeper circuit is configured to modulate a phase of the first LO signal; and
the second sweeper circuit is configured to modulate a phase of the second LO signal, wherein the second sweeper circuit is configured to modulate the phase of the second LO signal to cause the frequency of the second LO signal to sweep in a direction opposite the frequency of the first LO signal.

11. The system of claim 8, wherein the amplifier comprises:
a first digital power amplifier (DPA) circuit configured to amplify an amplitude of the in-intermediate phase signal based on the amplification setting; and
a second DPA circuit configured to amplify an amplitude of the intermediate quadrature signal based on the amplification setting.

12. The system of claim 11, wherein the DFE is further configured to:
generate a first amplification signal, wherein the first DPA circuit is further configured to amplify the amplitude of the intermediate in-phase signal based on the first amplification signal; and
generate a second amplification signal, wherein the second DPA circuit is further configured to amplify the amplitude of the intermediate quadrature signal based on the second amplification signal.

13. The system of claim 12, wherein the amplifier further comprises:
a first low-pass filter configured to filter out a high pass portion of the intermediate in-phase signal to generate the in-phase signal comprising the amplified amplitude; and
a second low-pass filter configured to filter out a high pass portion of the intermediate quadrature signal to generate the quadrature signal comprising the amplified amplitude.

14. The system of claim 8, wherein:
the system further comprises a clock source configured to generate a clock signal; and
the first LO signal and the second LO signal are further based on the clock signal.

15. A system comprising:
a digital front-end (DFE);
a sweeper electrically coupled to an output of the DFE;
a mixer electrically coupled to an output of the sweeper; and
an amplifier electrically coupled to an output of the mixer and an output of the DFE;
a first sweeper circuit electrically coupled to the output of the DFE and an input of the mixer; and
a second sweeper circuit electrically coupled to the output of the DFE and the input of the mixer.

16. The system of claim 15, wherein the mixer comprises:
a first mixer circuit electrically coupled to the output of the sweeper and an input of the amplifier; and
a second mixer circuit electrically coupled to the output of the sweeper and the input of the amplifier.

17. The system of claim 15, wherein the amplifier comprises:
a first digital power amplifier (DPA) circuit electrically coupled to the output of the mixer; and
a second DPA circuit electrically coupled to the output of the mixer.

18. The system of claim 17, wherein the amplifier further comprises:
a first low-pass filter electrically coupled to an output of the first DPA circuit; and
a second low-pass filter electrically coupled to an output of the second DPA circuit.

19. The system of claim 15, wherein the system further comprises a clock source electrically coupled to an input of the DFE and an input of the sweeper.

* * * * *